(12) United States Patent
Swanson

(10) Patent No.: US 10,131,495 B2
(45) Date of Patent: Nov. 20, 2018

(54) BULK MATERIAL UNLOADING SYSTEM

(71) Applicant: Astec Industries, Inc., Chattanooga, TN (US)

(72) Inventor: Malcolm L. Swanson, Chickamauga, GA (US)

(73) Assignee: Astec Industries, Inc., Chattanooga, TN (US)

( * ) Notice: Subject to any disclaimer, the term of this patent is extended or adjusted under 35 U.S.C. 154(b) by 0 days.

(21) Appl. No.: 15/434,684

(22) Filed: Feb. 16, 2017

(65) Prior Publication Data

US 2017/0233180 A1    Aug. 17, 2017

Related U.S. Application Data

(60) Provisional application No. 62/295,553, filed on Feb. 16, 2016.

(51) Int. Cl.
| | |
|---|---|
| *B65D 88/54* | (2006.01) |
| *B65D 88/64* | (2006.01) |
| *B65D 83/06* | (2006.01) |
| *B65G 33/14* | (2006.01) |
| *B65G 65/46* | (2006.01) |
| *B65G 33/18* | (2006.01) |

(52) U.S. Cl.
CPC ........... *B65D 88/546* (2013.01); *B65D 83/06* (2013.01); *B65D 88/64* (2013.01); *B65G 33/14* (2013.01); *B65G 65/46* (2013.01); *B65G 33/18* (2013.01)

(58) Field of Classification Search
CPC ...... B65D 88/546; B65D 83/06; B65D 88/64; B65G 33/14; B65G 65/46
See application file for complete search history.

(56) References Cited

U.S. PATENT DOCUMENTS

| | | | | |
|---|---|---|---|---|
| 1,783,092 | A * | 11/1930 | Lewis | F23K 3/00 110/105 |
| 3,036,737 | A | 5/1962 | King et al. | |
| 3,625,183 | A | 12/1971 | Tartar | |
| 4,875,820 | A * | 10/1989 | Lepp | B65G 33/32 198/550.1 |

(Continued)

FOREIGN PATENT DOCUMENTS

| | | |
|---|---|---|
| GB | 2520191 | 5/2015 |
| WO | WO 2015/131774 | 9/2015 |

OTHER PUBLICATIONS

International Search Report and Written Opinion of counterpart PCT Application No. PCT/US17/18124 dated May 10, 2017.

*Primary Examiner* — Frederick C Nicolas
(74) *Attorney, Agent, or Firm* — Chambliss, Bahner & Stophel, P.C.

(57) ABSTRACT

A bulk material storage container assembly for storing and unloading particulate material includes a storage vessel adapted to hold particulate material. A discharge port is in fluid communication with the storage vessel and with a discharge port outlet. The discharge port is also sized and shaped to facilitate bridging of particulate material. A shaft is mounted within the storage vessel adjacent to the discharge port and adapted for reciprocal movement with respect to the discharge port. A rake is mounted on said shaft and adapted to disaggregate particulate material that has bridged proximate the discharge port as the shaft is reciprocated with respect to the discharge port.

20 Claims, 3 Drawing Sheets

(56) References Cited

U.S. PATENT DOCUMENTS

| | | | | |
|---|---|---|---|---|
| 8,920,100 B1* | 12/2014 | Stahl | ...................... | B65D 88/68 |
| | | | | 198/550.01 |
| 2017/0152110 A1* | 6/2017 | Rauser | ................. | B65D 88/546 |

* cited by examiner

BULK MATERIAL UNLOADING SYSTEM

CROSS-REFERENCE TO RELATED APPLICATION

This application relates back to and claims the benefit of priority from U.S. Provisional Application for Patent Ser. No. 62/295,553, titled "Particulate Material Discharge System", which was filed on Feb. 16, 2016.

FIELD OF THE INVENTION

The present invention relates generally to devices and methods for handling bulk materials. More particularly, the present invention relates generally to a system for unloading bulk material in particulate form from a storage bin or container.

BACKGROUND AND DESCRIPTION OF THE PRIOR ART

Many particulate materials that are handled in bulk are stored in bins, silos, or similar vessels of various sizes and shapes. Examples of particulate materials that are stored in bulk in such vessels include coal; wood chips; sawdust; agricultural products such as grain, corn kernels, beans, flour, sugar, and peanuts; aggregate products such as sand and crushed stone; and industrial products such as plastic powders, coke, lime, silica gel, powdered acid resins, rare earth powders, and powdered alumina.

Storage vessels or containers for bulk particulate materials often include an unloading system that is associated with an outlet of the vessel. Such an unloading system may include a conveyor for transporting particulate material downstream for further processing. It is often necessary or desirable, when particulate material is unloaded from the storage vessel, to control the rate of discharge of particulate material from the storage vessel. Depending upon various factors, including the temperature, moisture content, permeability and compressibility of the particulate material, and the volume of particulate material stored in the vessel, the mass of particulate material in the vessel or container may compress that portion of the material at the bottom of the container proximate the discharge outlets. This compression can cause variations in the bulk density of the particulate material being unloaded, with the result that a discharge conveyor operating at a desired volumetric discharge rate may deliver a consistent volume of material but not a consistent mass of material, due to variations in bulk density of the particulate material. In addition, arching or bridging may occur in the vicinity of discharge outlets, when conditions are such that material in the vessel forms an arch, dome or bridge across or proximate to the outlet, especially when particulate material is stored to the capacity of the storage vessel. Arching or bridging may so restrict the flow of material through the outlet that it stops altogether. Under other circumstances, material may form a restricted open channel to the outlet, known as rat-holing, which limits the rate of discharge of material from the vessel in an uncontrolled manner.

Various assemblies and systems for bulk material storage and discharge are known in the art. In addition, various outlet designs are known for preventing arching or bridging at the outlet, or rat-holing. Nevertheless, conventional systems and assemblies often fail to provide a predictable and consistent volume and mass of unloading of particulate material from a storage vessel.

It would be desirable, therefore, if an apparatus and unloading system for a bulk material storage container assembly could be provided that would provide a predictable and consistent volume and mass of particulate material for downstream processing.

Advantages of the Preferred Embodiments of the Invention

Accordingly, it is an advantage of the preferred embodiments of the invention claimed herein to provide an apparatus and unloading system for a bulk material storage container assembly that provides a predictable and consistent volume and mass of particulate material for downstream processing.

Additional advantages of the preferred embodiments of the invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest possible construction consistent with such definitions, as follows:

The term "fluid communication" refers to an operative connection or association between components such as a storage vessel and a discharge port which allows for flow of particulate material from one such component to the other.

The term "linear actuator" refers to an electric, pneumatic, hydraulic, electro-hydraulic or mechanical device that generates force which is directed in a straight line. Common examples of "linear actuators" are hydraulic and pneumatic actuators which include a cylinder, a piston within the cylinder, and a rod attached to the piston. By increasing the pressure within the cylinder on one side of the piston (over that on the opposite side of the piston), the rod will extend from the cylinder or retract into the cylinder.

The term "rotary actuator" refers to an electric, hydraulic or electro-hydraulic motor or other device that generates force that is directed along an arc or about a center of rotation.

The term "actuator" (without a qualifying adjective) refers to a linear actuator or a rotary actuator.

SUMMARY OF THE INVENTION

A bulk material storage container assembly for storing and unloading particulate material comprises a storage vessel adapted to hold particulate material and a discharge port that is in fluid communication with the storage vessel. The discharge port is also in fluid communication with a discharge port outlet, and is sized and shaped to facilitate bridging of particulate material. A shaft is mounted in the storage vessel adjacent to the discharge port and adapted for reciprocal movement with respect to said discharge port, and a rake is mounted on the shaft. The rake is adapted to disaggregate particulate material that has bridged proximate the discharge port as the shaft is reciprocated with respect to the discharge port.

In other embodiments of the invention, a discharge system for a storage bin for particulate material encompasses a plurality of discharge ports, each of which is in adapted to enable passage of particulate material from within the storage bin to a discharge port outlet that is associated with the discharge port. Each discharge port is sized and shaped to facilitate bridging of particulate material. A shaft is provided with a plurality of rakes mounted thereon and is adapted for reciprocal movement with respect to the discharge ports. The rakes are located on the shaft such that each one will disaggregate particulate material that has bridged proximate at least one of the discharge ports as the shaft is reciprocated with respect to the discharge ports.

In order to facilitate an understanding of the invention, the preferred embodiments of the invention, as well as the best mode known by the inventor for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventor includes all equivalents of the subject matter recited in the claims, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
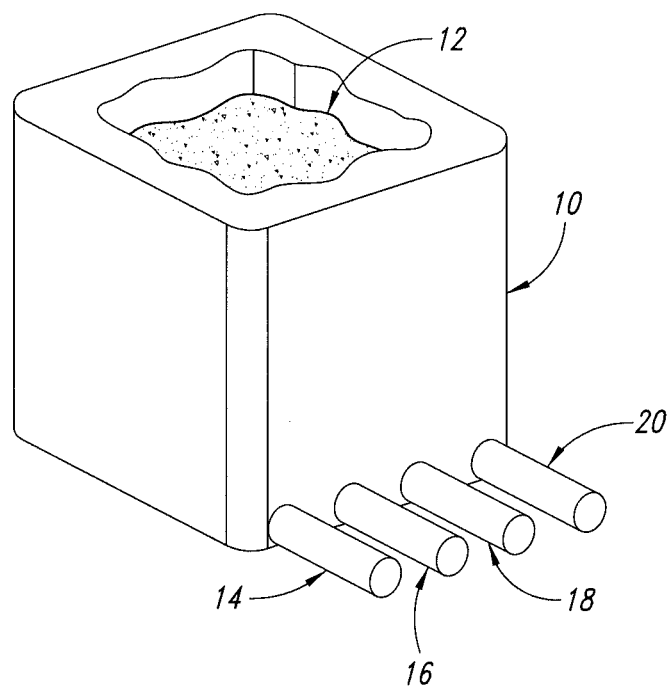
FIG. 1 is a perspective view of a preferred embodiment of a bulk material storage container assembly in accordance with the present general inventive concept.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Referring now to the drawings, a preferred embodiment of a bulk material storage container assembly in accordance with the present general inventive concept is illustrated generally in FIGS. 1 through 4. As shown therein, the invention contemplates a bulk material storage container assembly that is adapted to facilitate the creation of, and subsequent break up of, material bridges that form in particulate material adjacent to discharge ports in the container. Such material bridges may be formed when the material is stored in "overburden" conditions in a storage vessel—i.e., where particulate material is stored in quantities at or near the maximum capacity of the storage vessel and where the weight of upper layers of particulate material is sufficient to substantially compress lower layers and/or to push material in lower layers toward discharge outlets in the storage vessel. The preferred embodiments of the invention are adapted to facilitate the even and smooth discharge of particulate material from the storage vessel, thereby providing predictable and consistent volume and mass of particulate material in the unloading process.

Figure 2:
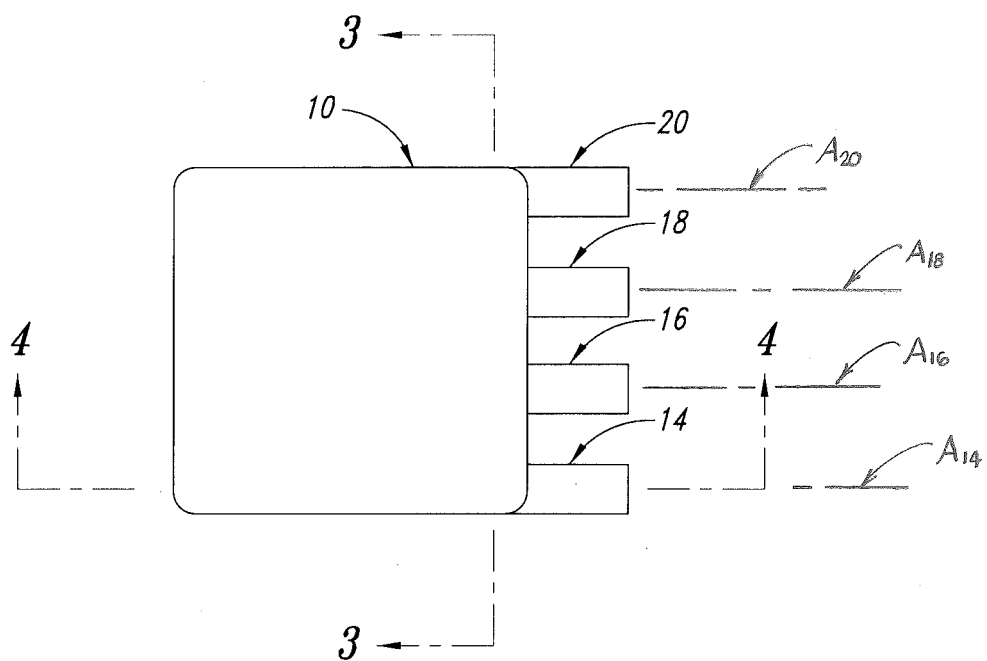
FIG. 2 is a top-down view of the embodiment of the bulk material storage container assembly illustrated in FIG. 1, showing the section lines along which are taken the views of FIGS. 3 and 4.

Turning now to FIG. 1, a preferred embodiment of a bulk material storage container assembly for storing and unloading particulate material is illustrated. This bulk material storage container assembly includes storage vessel 10 which is adapted to hold particulate material 12, which may be material of any of various types. A plurality of discharge ports 14, 16, 18 and 20 are provided and are in fluid communication with the storage vessel. Each of discharge ports 14, 16, 18 and 20 has a long axis $A_{14}$, $A_{16}$, $A_{18}$ and $A_{20}$, respectively (as shown in FIG. 2), and each is in a spaced parallel relationship with each of the other discharge ports. Preferably, each of discharge ports 14, 16, 18 and 20 is provided in the form of a trough with a lower part in the form of a portion of a cylinder. Furthermore, each discharge port is sized and shaped to facilitate bridging of particulate material 12. In other words, discharge ports 14, 16, 18, 20 are sized and shaped so as to cause particulate material of the type stored in the storage vessel 10 to form a material bridge proximate each discharge port, and these material bridges act to support particulate material stored above the discharge ports—i.e., the overburden, the particulate material located at a higher position within the storage vessel 10.

The desired bridging contemplated by the invention is affected by various properties of the particulate material being stored in the bulk material storage container. Material particle size, particle shape, whether the material is fibrous or non-fibrous, and its cohesive characteristics can affect the tendency of particulate materials to form bridges. Consequently, the characteristics of the size and shape of discharge ports 14, 16, 18 and 20, and more particularly, the characteristics of the openings that provide fluid communication from storage vessel 10 into the discharge ports, that must be bridged according to the invention can vary considerably depending upon various characteristics of the particulate material stored in storage vessel 10. Preferably, the discharge ports 14, 16, 18 and 20 are narrower than discharge ports in comparable vessels or hoppers used for storing similar particulate material. Generally, the width of each of the discharge ports, such as width $W_{14}$ of discharge port 14 (shown in FIG. 3) across the top of the trough is no more than 8×, and preferably no more than 6×, the diameter of the largest particles of material being stored in storage vessel 10. In some embodiments, in order to encourage bridging, the discharge ports 14, 16, 18 and 20 may include sharp edges and/or corners, and/or include sloping surfaces that have a relatively shallow gradient (e.g. less than about 60°) relative to the wall or floor of the storage vessel 10 on which the discharge ports 14, 16, 18 and 20 are located.

In some embodiments of the invention, the size or width of the discharge ports may be adjustable to allow for the discharge of different types of particulate material, particulate materials having different densities, and/or particulate materials having different average or maximum particle sizes.

Figure 3:
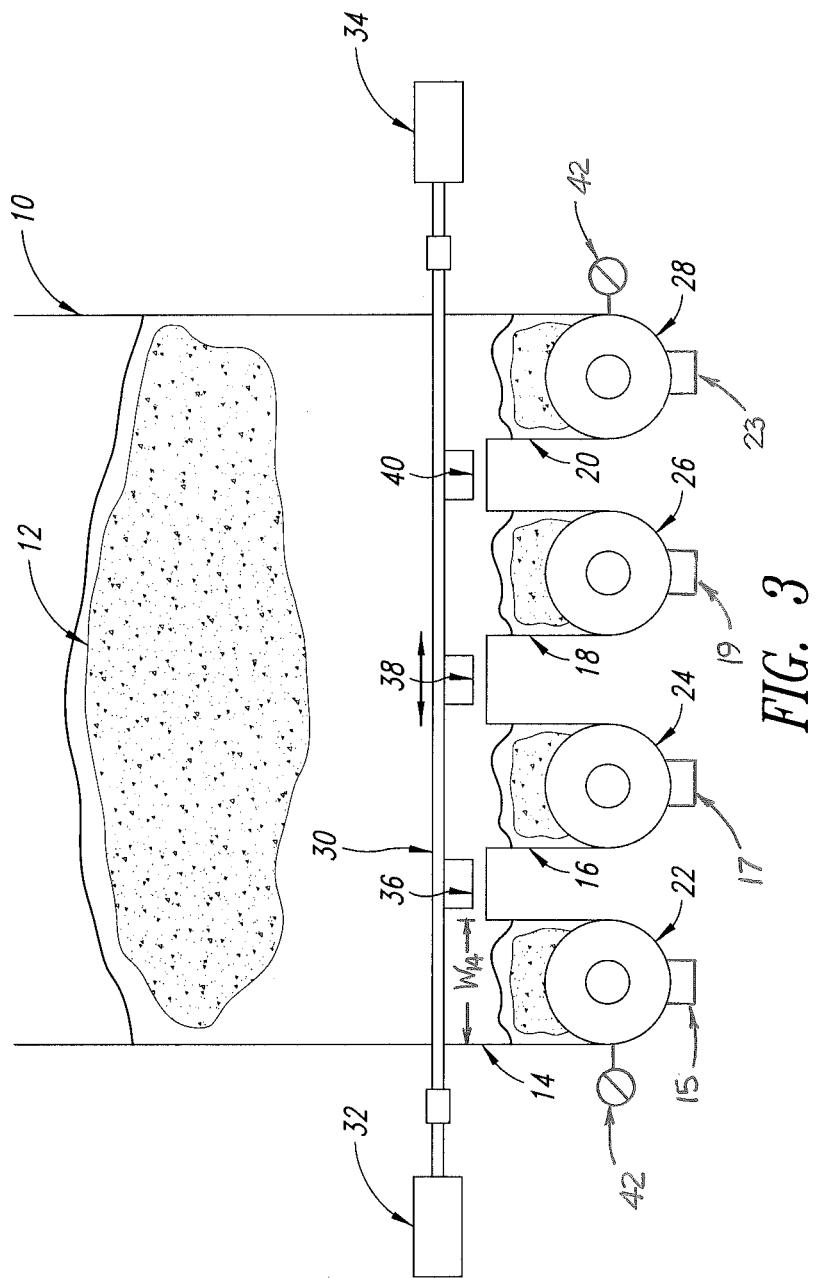
FIG. 3 is a first section view of the embodiment of the bulk material storage container assembly illustrated in FIGS. 1 and 2.

Each of discharge ports 14, 16, 18 and 20 is adapted to enable passage of particulate material 12 out of storage vessel 10 to a discharge port outlet 15, 17, 19 and 23, respectively. As shown in FIG. 3, shaft 30 is mounted within storage vessel 10 adjacent to and above the discharge ports 14, 16, 18 and 20. Shaft 30 is adapted for reciprocal movement with respect to the discharge ports 14, 16, 18 and 20, as shown by the double-headed arrow above shaft 30 in FIG. 3. A plurality of rakes 36, 38 and 40, preferably in the form of flat blades, are mounted on the shaft 30. Preferably, the number of rakes mounted on each shaft is one fewer than the number of discharge ports associated with the storage vessel. Thus, rakes 36, 38 and 40 are adapted to break up or disaggregate particulate material that has aggregated or bridged adjacent the discharge ports 14, 16, 18 and 20, as shaft 30 is reciprocated with respect to the discharge ports.

In some embodiments of the invention, the width of the opening that provides fluid communication between storage vessel 10 and the discharge ports slot can be much larger than 6× or 8× the diameter of the largest particles, because in some cases, small openings into the discharge ports can be too narrow for a bridge collapse sufficiently when struck by a rake. A very narrow opening into the discharge port will cause the bridge to reform immediately, in some cases, without any significant amounts of material falling into the discharge ports. The invention contemplates structures that facilitate the collapse and reformation of bridges with sufficient time between these events to allow material to flow into the discharge ports.

Figure 4:
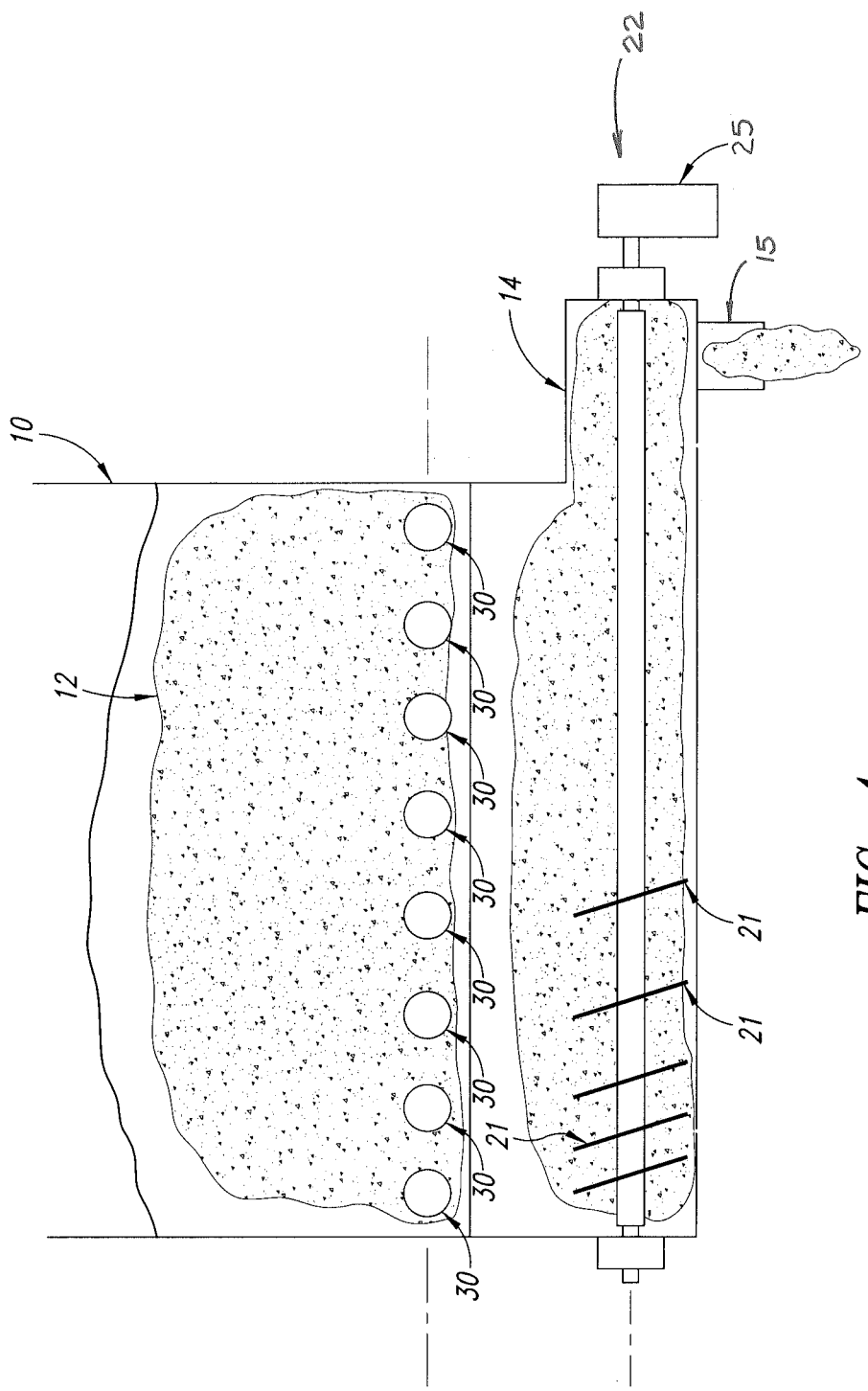
FIG. 4 is a second section view of the embodiment of the bulk material storage container assembly illustrated in FIGS. 1 through 3.

In the illustrated embodiment, as shown in FIGS. 3 and 4, bulk material storage container assembly 10 includes a plurality of material driving members 22, 24, 26 and 28. Each material driving member is located proximate and/or in an associated discharge port. Thus, for example, as seen in FIG. 3, driving member 22 is located proximate discharge port 14; driving member 24 is located proximate discharge port 16; driving member 26 is located proximate discharge port 18; and driving member 28 is located proximate discharge port 20. The material driving members are adapted to move particulate material within the discharge ports 14, 16, 18 and 20 toward discharge port outlets 15, 17, 19 and 23 respectively. Preferably, the material driving members comprise screw feeders and associated rotary actuators. Thus, for example, FIG. 4 shows driving member 22 that comprises a screw feeder in discharge port 14, which includes a plurality of screw blades 21 (shown in schematic), and associated rotary actuator 25. Of course, those having ordinary skill in the art will appreciate that a typical screw feeder will include a plurality of screw blades spaced along its length. In some embodiments of the invention, material driving members may comprise discharge conveyors. Preferably, the material driving members are capable of operation at variable pitch and/or variable speed.

Preferably, the bulk material storage container assembly includes a plurality of shafts 30 (shown in FIG. 4), with each shaft 30 having a plurality of rakes (such as rakes 36, 38 and 40 shown in FIG. 3) mounted thereon that are spaced across the width of storage vessel 10. Preferably, the number of rakes mounted on each shaft is one fewer than the number of discharge ports associated with the storage vessel. It is also preferred that the discharge ports are arranged so that their long axes are generally parallel to each other, as shown in FIG. 2, and that each of the shafts is mounted generally perpendicular to the long axes of the discharge ports, as shown by reviewing FIGS. 3 and 4.

Through the reciprocal motion of the shafts, the rakes mounted on the shafts disaggregate particulate material that has bridged or aggregated proximate the discharge ports. As noted above, the invention contemplates that clumped or packed particulate material within storage vessel 10 will form material bridges above or proximate to the discharge ports, and the reciprocating motion of the rakes mounted on the shafts, as the rakes slice or pass through this clumped or packed particulate material, causes the material bridges to collapse, whereupon the particulate material that had formed the material bridges proceeds to pass into the discharge ports. In this way the shafts and rakes facilitate the movement of particulate material into the discharge ports. The shafts and rakes further break up compressed particulate material within the material bridges, so that the particulate material that exits storage vessel 10 through the discharge port outlets has a substantially uniform density. In this way, a predictable and consistent volume and mass of particulate material for downstream processing is unloaded from storage vessel 10. Generally, when a rake, in the course of its reciprocating movement within the storage vessel, moves away from the former location of a material bridge proximate a discharge port, particulate material flowing down from a position higher up within the storage vessel will settle into that location and form a new material bridge, so long as a sufficient quantity of particulate material remains within the storage vessel to supply the necessary overburden pressure for a material bridge to form.

Generally, at least one linear actuator is provided to drive and direct the motion of each of the shafts 30 within the storage vessel 10. Preferably, each shaft 30 is connected to or is in communication with at least one linear actuator dedicated to that particular shaft. In some embodiments, a double-acting linear actuator is connected to or in communication with each shaft. In the illustrated embodiment of the invention, single-acting linear actuators 32 and 34 are in communication with the illustrated shaft 30, as shown in FIG. 3. Preferably, a controller is provided to control the speed of the reciprocal motion applied to each shaft 30 and its rakes.

In some embodiments of the invention, some or all of the plurality of discharge ports may include a valve, such as valve 42 (shown in schematic form in FIG. 3) that is adapted to control the flow of material through the associated discharge port—that is, a valve movable between an open position and a closed position, such that when a valve associated with a discharge port is in the open position, particulate material is able to pass through that discharge port, and when a valve associated with a discharge port is in the closed position, particulate material is not able to pass through that discharge port.

The preferred embodiments of the invention allow for the controlled movement and discharge of particulate material from within a storage vessel, facilitating even and smooth transport of particulate material and keeping downstream discharge conveyors full without there being a significant variation in bulk density of material in the discharge conveyors. Such a system allows the downstream discharge conveyors to deliver a predictable and consistent volume and mass of particulate material for downstream processing.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A bulk material storage container assembly for storing and unloading particulate material, said bulk material storage container assembly comprising:
   (a) a storage vessel adapted to hold particulate material;
   (b) a discharge port which is:
      (i) in fluid communication with the storage vessel;
      (ii) in fluid communication with a discharge port outlet;
      (iii) sized and shaped to facilitate bridging of the particulate material;
   (c) a shaft mounted within said storage vessel adjacent to the discharge port and adapted only for reciprocal movement with respect to said discharge port;
   (d) a rake mounted on the shaft and adapted to disaggregate the particulate material that has bridged proximate said discharge port as the shaft is reciprocated with respect to the discharge port.

2. The bulk material storage container assembly of claim 1 wherein the discharge port comprises an opening that provides fluid communication from the storage vessel into the discharge port, the opening being sized and shaped to facilitate bridging of the particulate material.

3. The bulk material storage container assembly of claim 1 further comprising a material driving member which is:
   (a) located in the discharge port;
   (b) adapted to move the particulate material within the discharge port to the discharge port outlet.

4. The bulk material storage container assembly of claim 1 wherein the discharge port includes a valve movable between an open position and a closed position, such that when the valve is in the open position the particulate material is able to pass through the discharge port, and when the valve is in the closed position the particulate material is not able to pass through the discharge port.

5. The bulk material storage container assembly of claim 1 further comprising at least one linear actuator adapted to drive the reciprocal movement of the shaft.

6. The bulk material storage container assembly of claim 1 wherein:
   (a) the discharge port has a long axis;
   (b) the shaft is mounted perpendicular to the long axis of the discharge port.

7. The bulk material storage container assembly of claim 6 further comprising:
   (a) a plurality of shafts, each of which is mounted above and perpendicular to the long axis of the discharge port, said shafts being mounted in spaced parallel relationship with each other, wherein each of the shaft is adapted for reciprocal movement with respect to the discharge port;
   (b) a rake mounted on each shaft and adapted to disaggregate the particulate material that has bridged proximate the discharge port as the shaft is reciprocated with respect to the discharge port.

8. A bulk material storage container assembly for storing and unloading particulate material, said bulk material storage container assembly comprising:
   (a) a storage vessel adapted to hold particulate material;
   (b) a discharge port which:
      (i) is in fluid communication with the storage vessel;
      (ii) is in fluid communication with a discharge port outlet;
      (iii) is sized and shaped to facilitate bridging of the particulate material;
      (iv) comprises a trough with a top having a width and a lower part comprising a portion of a cylinder;
   (c) a shaft mounted within said storage vessel adjacent to the discharge port and adapted for reciprocal movement with respect to said discharge port;
   (d) a rake mounted on the shaft and adapted to disaggregate the particulate material that has bridged proximate said discharge port as the shaft is reciprocated with respect to the discharge port.

9. The bulk material storage container assembly of claim 8 wherein:
   (a) the particulate material in the storage vessel comprises particles having a particle size with a diameter within a range from largest to smallest;
   (b) the discharge port has a width across the top of the trough that is no more than 8 times the diameter of the particulate material of the largest particle size that is being stored in the storage vessel.

10. The bulk material storage container assembly of claim 8 further comprising a material driving member which comprises a screw feeder.

11. The bulk material storage container assembly of claim 10 wherein the screw feeder:
    (a) includes a plurality of screw blades spaced along a length of the screw feeder;
    (b) is adapted to move the particulate material towards the discharge port outlet.

12. An unloading system for a storage vessel for particulate material, said unloading system comprising:
    (a) a plurality of discharge ports, each of which:
       (i) is adapted to enable passage of the particulate material from within the storage vessel to a discharge port outlet that is associated therewith;
       (ii) includes an opening that is in fluid communication with the storage vessel, said opening being sized and shaped to facilitate bridging by the particulate material;

(iii) has a long axis that is in a spaced parallel relationship with the long axis of each of the other discharge ports;

(b) a shaft mounted within said storage vessel proximate the discharge ports, said shaft being adapted only for reciprocal movement with respect to the discharge ports;

(c) a plurality of rakes mounted on the shaft, with each of the rakes being adapted to disaggregate the particulate material that has bridged proximate at least one of the discharge ports, as the shaft is reciprocated with respect to the discharge ports.

13. The unloading system of claim 12 wherein the plurality of rakes comprises a number of rakes and wherein the plurality of discharge ports comprises a number of discharge ports and the number of rakes mounted on the shaft is one fewer than the number of discharge ports.

14. The unloading system of claim 12 wherein each of said plurality of discharge ports includes a valve movable between an open position and a closed position, such that when the valve associated with one of the discharge ports is in the open position, the particulate material is able to pass through the discharge port, and when the valve associated with one of the discharge ports is in the closed position, the particulate material is not able to pass through the discharge port.

15. The unloading system of claim 12 further comprising at least one linear actuator adapted to drive the reciprocal movement of the shaft.

16. The unloading system of claim 12 further comprising a plurality of material driving members, with each of the material driving members being:

(a) located in one of the discharge ports;

(b) adapted to move the particulate material within the discharge port in which the material driving member is located to the discharge port outlet associated therewith.

17. The unloading system of claim 16 wherein each of the material driving members comprises a screw feeder.

18. The unloading system of claim 12 wherein:

(a) each of the discharge ports comprises a trough with a lower part in a form of a portion of a cylinder;

(b) the shaft is mounted perpendicular to the long axis of each of the discharge ports.

19. The unloading system of claim 18 further comprising:

(a) a plurality of shafts, each of which is mounted above and perpendicular to the long axis of each of the discharge ports, said shafts being mounted in spaced parallel relationship with each other, wherein each of the shafts is adapted for reciprocal movement with respect to said discharge ports;

(b) a rake mounted on each shaft and adapted to disaggregate the particulate material that has bridged proximate said discharge port as the shaft is reciprocated with respect to the discharge port.

20. The unloading system of claim 19 wherein the plurality of rakes comprises a number of rakes and wherein the plurality of discharge ports comprises a number of discharge ports and the number of rakes mounted on each shafts is one fewer than the number of discharge ports.

* * * * *

UNITED STATES PATENT AND TRADEMARK OFFICE
CERTIFICATE OF CORRECTION

PATENT NO. : 10,131,495 B2  
APPLICATION NO. : 15/434684  
DATED : November 20, 2018  
INVENTOR(S) : Malcolm L. Swanson It is certified that error appears in the above-identified patent and that said Letters Patent is hereby corrected as shown below:

In the Claims

Claim 7, Line 6, change: "ship with each other, wherein each of the shaft is" to --ship with each other, wherein each of the shafts is--

Claim 20, Line 4, change: "ports and the number of rakes mounted on each shafts is one" to --ports and the number of rakes mounted on each of the shafts is one--

Signed and Sealed this  
First Day of January, 2019

Andrei Iancu  
*Director of the United States Patent and Trademark Office*